United States Patent

Flagle

[15] 3,654,385

[45] Apr. 4, 1972

[54] COLOR TELEVISION SYSTEM

[72] Inventor: Harry David Flagle, Studio City, Calif.

[73] Assignee: Video West, Inc., Beverly Hills, Calif.

[22] Filed: July 7, 1969

[21] Appl. No.: 839,175

[52] U.S. Cl. ....................178/5.4 SY, 178/5.2 R, 178/5.4 C, 178/5.4 CD, 178/5.4 CF, 318/229

[51] Int. Cl. ....................H04n 9/34

[58] Field of Search ....................178/5.4 CF, 5.4 C, 5.4 CD, 178/5.4 SY, 5.4 AC, 5.4 R, 5.2 R, 5.2 A, 5.4; 318/229

[56] References Cited

UNITED STATES PATENTS

| | | | |
|---|---|---|---|
| 2,389,039 | 11/1945 | Goldsmith | 178/5.4 |
| 2,428,946 | 10/1947 | Somers | 178/5.4 |
| 2,437,301 | 3/1948 | Lobosco | 318/229 |
| 2,780,668 | 2/1957 | Farr et al. | 178/5.4 |
| 3,030,437 | 4/1962 | James et al. | 178/5.4 |
| 3,351,707 | 11/1967 | Drexfoos et al | 178/5.2 |
| 3,440,340 | 4/1969 | Sugihara | 178/5.4 |
| 3,506,775 | 4/1970 | McMann, Jr. | 178/5.2 |
| 3,507,982 | 4/1970 | Sugihara | 178/5.4 |
| 2,580,073 | 12/1951 | Burton | 178/5.4 |
| 2,601,516 | 6/1952 | Gray | 178/5.4 |
| 2,423,769 | 7/1947 | Goldsmith | 178/5.4 |

*Primary Examiner*—Richard Murray
*Assistant Examiner*—P. M. Pecori
*Attorney*—Flehr, Hohbach, Test, Albritton & Herbert

[57] ABSTRACT

A color television system employing a camera tube with a rotating disc or drum serving to filter the light impinging on the tube to sequentially provide red, green and blue images or fields of the object being viewed to the tube. The rotating member is driven by a synchronous motor at a rate which provides images at 120 c.p.s. rate. The camera tube circuit includes means for decreasing the lag of the tube whereby it operates with minimum mixing of the colors between fields. A motor control keeps the rotating member in phase with the vertical synchronizing pulses. The output signal from the camera tube is amplified and applied to separate circuits for independently adjusting the gain of the color field signals produced by the camera. The signals are gated to provide sequential fields and synchronizing signals added. The synchronizing signals include horizontal and vertical pulses and a high frequency burst to mark the beginning of a selected color field signal. The composite signal can be recorded and reproduced by a conventional black and white television recorder. A switching and control circuit serves to control the tri-color tube of a conventional receiver to sequentially display the color fields at a 40 c.p.s. rate. Persistence of vision melds or blends the fields to give the effect of a color image. The receiver may be used to receive conventional NTSC color signals.

7 Claims, 15 Drawing Figures

INVENTOR.
HARRY D. FLAGLE
BY Fluke, Hohbach, Test, Albritton & Herbert
ATTORNEYS

PATENTED APR 4 1972 3,654,385

SHEET 2 OF 7

INVENTOR.
HARRY D. FLAGLE
BY Fidler, Hohbach, Test Albritton & Herbert
ATTORNEYS INVENTOR.
HARRY D. FLAGLE
BY Fidler, Hohbach, Test Albritton & Herbert
ATTORNEYS INVENTOR.
HARRY D. FLAGLE
BY Fidler, Hollback, Fist, Albritton & Herbert
ATTORNEYS INVENTOR.
HARRY D. FLAGLE
BY Fluke, Hubbard, Teit Albritton & Herbert
ATTORNEYS INVENTOR.
HARRY D. FLAGLE
BY Fisher, Hohbach, Test Albritton & Herbert
ATTORNEYS INVENTOR.
HARRY D. FLAGLE
BY Fleit, Hohbach, Test Albritton & Herbert
ATTORNEYS

COLOR TELEVISION SYSTEM

BACKGROUND OF THE INVENTION

This invention relates generally to a field sequential color television system and more particularly to a system in which the color signals can be recorded and reproduced on a conventional black and white television magnetic tape recorder and can be presented and displayed on a conventional receiver which can also be used to receive NTSC signals.

Field sequential color television systems have employed color wheels or drums which provide in sequence to the camera tube images of the object in red, blue and green whereby the output signal from the camera tube includes a sequence of field signals. Certain of these systems have included means for identifying the beginning of fields of a particular color. The prior art systems have in general used a field rate which is different from the conventional NTSC field rate whereby special camera equipment is required to generate the field signals and special monitors are required to provide a display. This is, of course, what makes such systems relatively expensive.

SUMMARY OF THE INVENTION AND OBJECTS

There is provided a color television system for generating television signals comprising means for generating horizontal and vertical sync signals and a camera tube including a beam adapted to be deflected responsive to said horizontal and vertical sync signals to scan an image impinging upon the tube and provide sequential field signals representative of the image at the vertical sync rate. A rotating member is disposed to filter light impinging on the camera tube to cause red, green and blue images of the subject being viewed to impinge on the camera tube. The rotating member is driven by a synchronous motor to rotate in synchronism with the vertical sync rate. Sequencing pulses are generated at the beginning of one color of said field or image and are employed to synchronize the television system. Means are provided for receiving said vertical sync pulses and the sequencing pulses and control the phase of the motor. The signal from the camera tube is amplified and applied to individual gain controls for controlling the gain of each color and the reference level for each color is adjusted. The color signals are selectively gated to a video amplifier which receives horizontal and vertical synchronizing pulses together with a high frequency burst signal generated responsive to the sequence pulse to identify the beginning of the selected color and to maintain the recording, reproducing and display system in synchronism. The television signal generated has a base frequency of 60 cycles and can be recorded on conventional black and white television recorders in such a manner as to record two fields during each scan. Switching between the helical scans takes place during the synchronizing intervals. The high frequency burst is selected from the reproduce signal and used to control a sequence timer which, in turn, controls a tri-color display tube to project in sequence fields of corresponding colors. The television receiver includes switching means which can be switched either to receive the signals directly from the color TV tube or from a black and white TV recorder-reproducer.

It is a general object of the present invention to provide a field sequential color television system which employs a single inexpensive black and white camera tube in connection with a rotating disc or drum for providing field sequential output color signals.

It is another object of the present invention to provide a television system in which an inexpensive black and white camera tube is employed in connection with a rotating drum or wheel and associated circuits to provide a field sequential television signal including horizontal and vertical field identifying pulses.

It is another object of the present invention to provide a color television system of the field sequential type in which the field sequential signals can be recorded and reproduced directly on a conventional black and white television magnetic tape recorder and reproduced in a conventional NTSC receiver.

It is a further object of the present invention to provide a color television system which is simple in design and inexpensive whereby to make it readily available and useful to the average homeowner.

The foregoing and other objects of the invention will become more clearly apparent from the following description when taken in connection with the accompanying drawings.

DESCRIPTION OF THE PREFERRED EMBODIMENT

GENERAL

Figure 1:
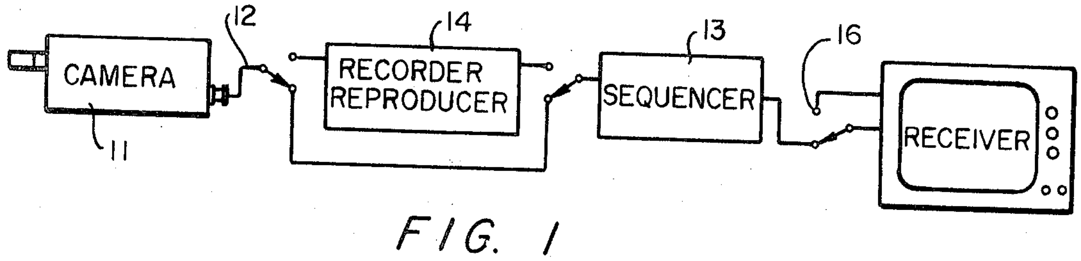
FIG. 1 is a schematic diagram showing a system including camera, magnetic tape recorder-reproducer and receiver.

A television system in accordance with the present invention is illustrated in FIG. 1. The system includes a camera 11, hereinafter described, which provides a field sequential color television signal at its output 12. The field sequential signal includes vertical and horizontal synchronizing pulses, color picture information, and high frequency bursts preceding a selected color field to identify the field. The high frequency bursts are used to synchronize the system for recording and reproduction. The signal on the line 12 may be connected directly to a sequencer 13 or to a recorder-reproducer 14 which serves to record the television signal. In accordance with the present invention, the recorder-reproducer can be a black and white television recorder.

The direct signal from the camera or the reproduce signal from the recorder-reproducer is applied to the sequencer 13. The sequencer 13 provides output signals which control the R-Y, G-Y and B-Y amplifiers associated with the picture tube of a conventional color receiver to selectively turn on the associated red, green or blue guns which receive the television signal and provide sequential color fields. The present system operates at a 60 c.p.s. rate. The sequential color fields are presented to the receiver at a 120 c.p.s. rate which means the three colors or complete color picture is presented at a 40 c.p.s. rate. This is well above the rate which would cause flicker or color separation.

By switching the receiver to the internal connection 16, the sequencer is disconnected and the circuits in the receiver are reestablished whereby it can receive a conventional NTSC color signal from its antenna.

CAMERA SYSTEM

Figure 2A:
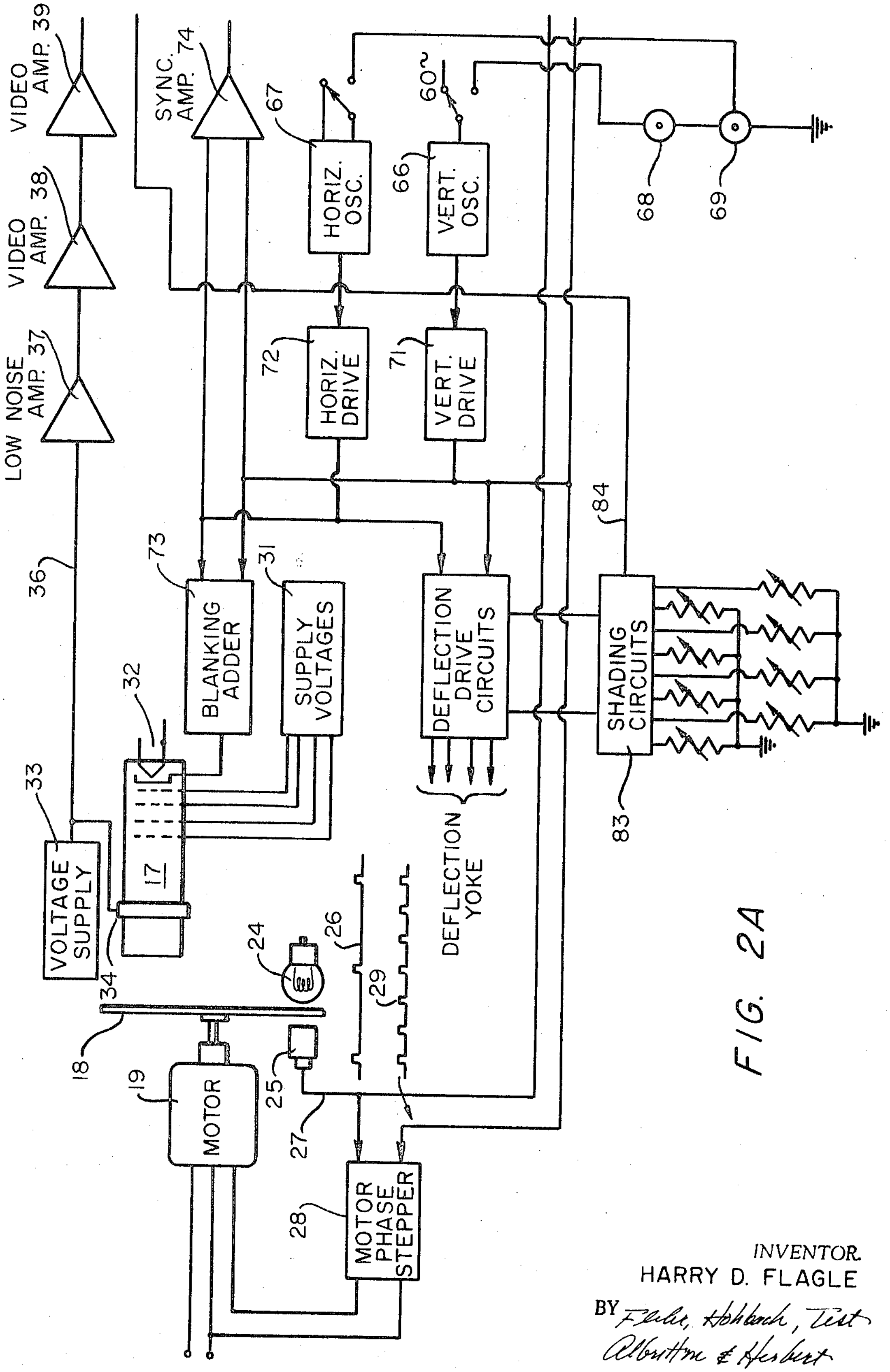
FIGS. 2A and 2B are block diagrams of a color television camera system in accordance with the present invention.
Figure 2B:
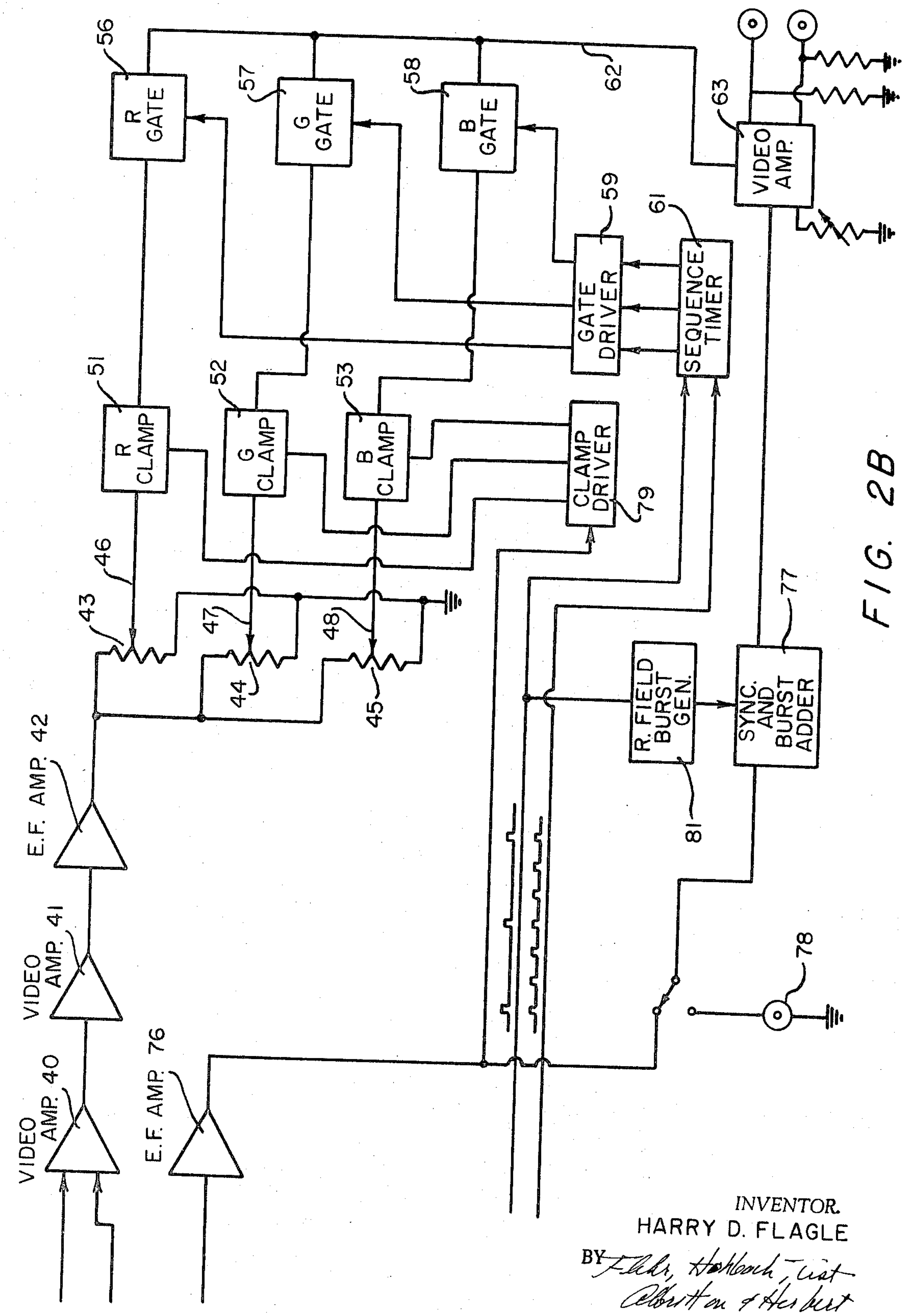
Figure 12:
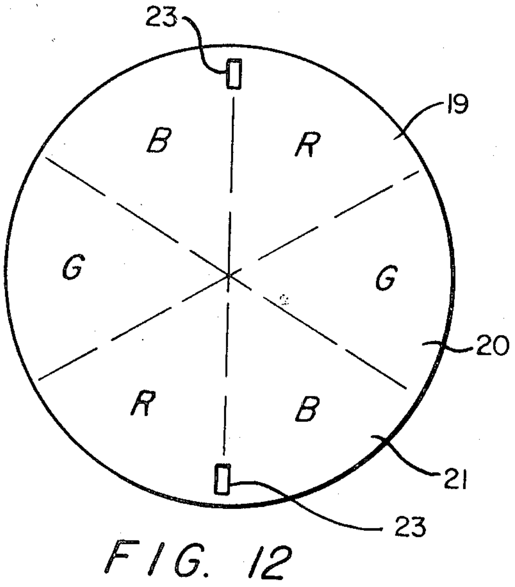
FIG. 12 is a view showing a rotating color wheel or disc for use in the system.

The camera portion 11 is illustrated in FIGS. 2A and 2B. The camera system includes a camera tube 17 which can be a Vidicon, Plumbicon, PBO camera tube, or any other suitable black and white camera tube. Vidicon tubes are preferable since they are small and relatively inexpensive. A color separator wheel or disc 18, FIGS. 2A and 12, is disposed to rotate in front of the tube face to filter the light impinging on the tube and sequentially provide red, green and blue images of the object being viewed to the camera tube. The color wheel 18 is provided with six segments having red, green and blue filters 19, 20 and 21, respectively. The wheel 18 is driven by a synchronous motor 19 connected to a 60 c.p.s. power source. The image or field frequency is, therefore, 120 c.p.s. Notches or openings 23 are formed in the color wheel immediately preceding the red segments 19. A source of light 24 is disposed on one side of the color wheel 18 and a photoresponsive device 25 is disposed on the opposite side whereby as the wheel rotates, sequencing pulses 26 are generated on the line 27 which identify the beginning of the red filter segment, and consequently the red image and field.

The motor drive includes a phasing circuit 28, to be described, which receives the vertical sync pulses 29 and the sequencing pulses 26 and brings the color wheel 18 in phase with the vertical sync pulses applied to the camera tube. When the color wheel is in phase, the vertical synchronizing pulses are in time synchronism with the sequencing pulses.

Conventional voltage supply means 31 supplies voltages to the camera tube electrodes. Heater voltage is applied to the heater 32 by a heater supply (not shown). A voltage supply 33, to be described hereafter, supplies voltage to the target electrode 34.

The color field picture signal appears on the line 36. The signal is amplified by a low noise amplifier 37 and applied to video amplifiers 38, 39, 40 and 41. The output of the amplifier 41 is applied to an emitter-follower 42 which provides the amplified picture field information to potentiometers 43, 44 and 45 which are associated with the red, green and blue fields, respectively. The potentiometer taps 46, 47 and 48 are adjustable to control the amplitude of the corresponding video signal applied to red, green and blue clamping circuits 51, 52 and 53, respectively. The clamping circuits act in a conventional manner to maintain the reference level for each of the field color signals.

The clamped signals are applied to the red, green and blue gates 56, 57 and 58 which are controlled by gate driver 59 and sequence timer 61 which sequentially open gates 56, 57 and 58 in synchronism with rotation of the color wheel whereby the red gate 56 is open when red image impinges upon the camera tube to pass the red field color signal; the green gate opens when the green image impinges on the camera tube to pass the green field color signal; and the blue gate opens when the blue image impinges on the camera tube to pass the blue field color signal. The sequential field signals are along the line 62 to the video amplifier 63.

It is seen that by the arrangement just described it is possible to individually vary the amplitude of the three primary color signals applied to the line 62. This permits electronic balancing of any variations in transmission characteristics of the color wheel filters and variations between color filters of different color wheels. Accurate optical balancing of the color wheel would be time-consuming and expensive.

The vertical and horizontal synchronizing signals applied to the camera tube and added to the video signal are derived by vertical and horizontal sync oscillators 66 and 67. In the internal position, the vertical oscillator is synchronized from the 60 c.p.s. line voltage and doubles the frequency to give 120 c.p.s. vertical deflection pulses. The horizontal oscillator 67 is free-running at a 15,750 c.p.s. rate. In the external position, the vertical and horizontal oscillators are synchronized by vertical and horizontal synchronizing pulses applied at the inputs 68 and 69.

The outputs of the vertical and horizontal oscillators 66 and 67 are applied to vertical and horizontal drive circuits 71 and 72, respectively. The output of these circuits is applied to the deflection drive circuits associated with the deflection yoke (not shown) of the camera tube 17 to appropriately scan the camera tube electron beam to generate the field signals appearing at the target 34. The horizontal drive signal 72 and vertical drive signal 71 are also applied to the blanking adder 73 adapted to blank the electron beam during horizontal and vertical retrace.

The signals are also applied to a sync amplifier 74 which is connected to an emitter-follower 76. The emitter-follower output is applied to the sync and burst adder 77. The output of the sync and burst adder is connected to the video amplifier 63 and provides the synchronizing signals which are combined with the field sequential signals applied along the line 62 to provide the composite television signal at the output. The composite signal includes the television picture information, vertical and horizontal synchronizing pulses, and sequencing frequency burst as will be described. The sync burst adder is adapted to be connected to a sync input 78 to receive synchronizing information.

The vertical sync signals appearing at the output of the drive 71 are also applied to the motor phase stepper wherein they are compared with the sequence pulses derived on the line 27 to step the motor 19 to bring it in phase, as previously described.

In the external position, the circuit is arranged to operate on a 4:1 interlace. In the internal position, the horizontal oscillator is free-running and there is random interlace.

The output of the emitter-follower 76 is also applied to the clamping drive circuit 79 which serves to apply control signals to the clamps 51, 52 and 53 associated with the red, blue and green signals and to clamp the signals at a reference level.

Figure 11:
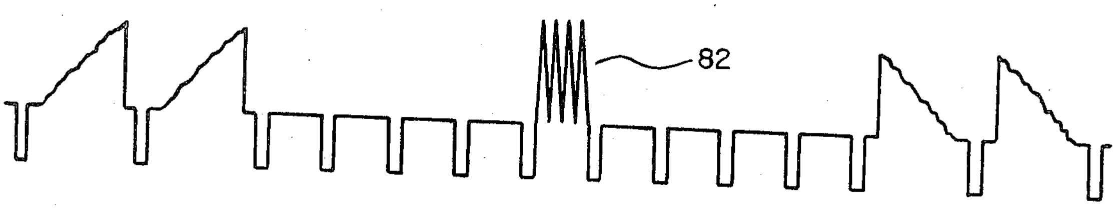
FIG. 11 shows the vertical pulse train carrying the high frequency burst identifying the selected color field.

The sequencing pulses derived by the photoresponsive device 25 and appearing on the line 27 is applied to a red field burst generator 81, to be presently described. The generator 81 generates 100 kc. bursts. These bursts are added to the sync pulses in the sync and burst adder 77 so that they appear on the vertical synchronizing pulse preceding each red field. The burst appears generally in the vertical pulse location as shown at 82, FIG. 11.

Thus, in addition to having the television signals and the horizontal and vertical synchronizing signals on the composite field sequential signal, there is also a color burst preceding each of the red fields to identify the beginning of the red field.

The sequence timer previously described receives both the vertical synchronizing pulses and the sequence pulse and generates gating signals which are applied to the gate driver 59 in synchronism with rotation of the color wheel or disc to assure that the colors are gated into video amplifier 63 in synchronism with rotation of the color wheel.

The present system includes means for correcting shading. As is well known, shading refers to non-uniform sensitivity over the picture area or non-uniform lighting of the subject being televised. Shading is particularly important in color television systems since variations may cause loss of balance of color between areas of the television system. Shading can generally be corrected by the addition of special waveforms to the video signals representing each field.

Experience has shown that adequate shading corrections can be achieved by providing horizontal and vertical sawtooth and parabolic wafeforms of either polarity with adjustable amplitude for addition to the field signals. In the instant system, there is provided a vidicon shading circuit 83 which is adapted to receive signals from the deflection drive circuit and from the vertical and horizontal drive circuits and to process the same and provide correction signals on the line 84. The correction signals are added to the field signals at the video amplifier 40. In general, the linear shading signals are obtained directly from the vertical and horizontal deflection drive sawtooth waveforms, while the parabolic signals are obtained by differentiating and integrating circuits which accept and shape the waveform. A form of shading generator is shown at page 309, "Color Television Engineering," McGraw-Hill, 1955.

MOTOR PHASE STEPPER

Figure 3:
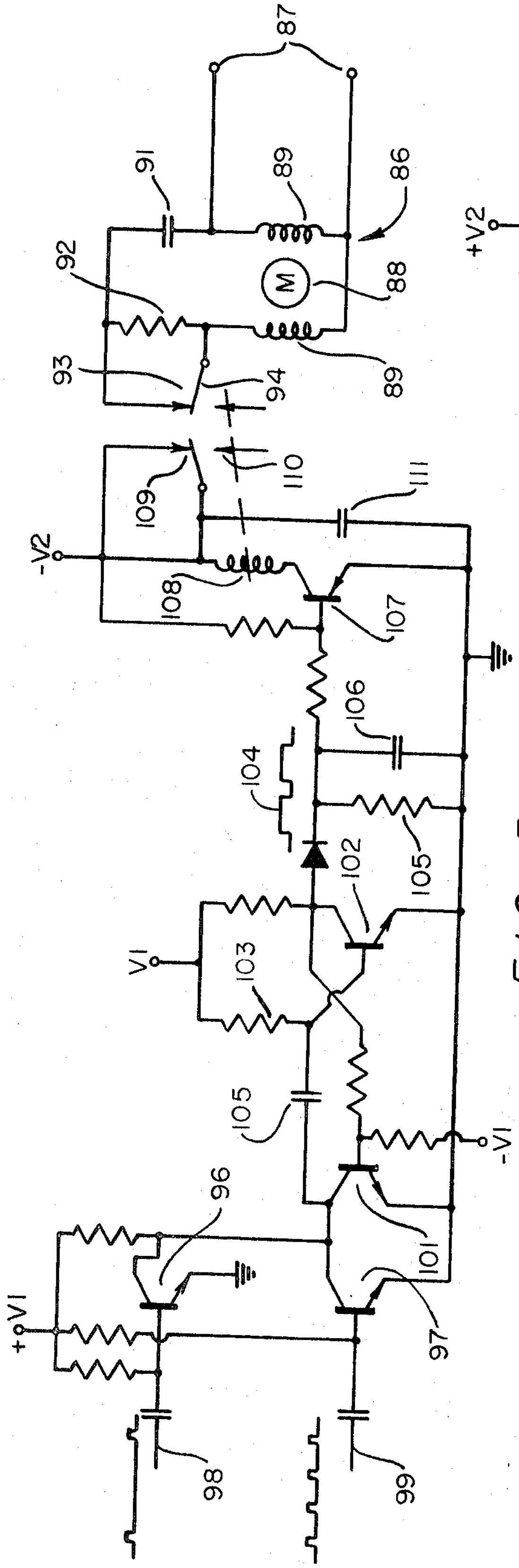
FIG. 3 is a circuit diagram of a motor phase control circuit suitable for use in the system.

The motor phase stepper to step the phase of the motor which drives the color wheel to assure that sequencing pulses occur in proper phase with respect to the sync pulses is shown in FIG. 3. A synchronous motor 86 is connected to be energized from the voltage supplied at terminals 87. The motor is of conventional construction including an armature 88 and field coils 89 and capacitor 91. The present motor differs from a conventional motor in that it includes a resistor 92 in the field circuits. Relay contacts 93 and 94 are arranged to short out resistor 92 when they are closed. With the resistor shorted out of the circuit, the motor operates in a conventional manner to maintain synchronism with the line voltage at terminals 87. When the contacts open, the resistor is placed in the circuit and serves to provide a phase shift in the voltage applied to the field windings 89. This causes a phase in the motor to slip out of sync with the applied voltage. The motor continues to slip until the relay is closed, at which time the motor will operate in synchronism with the line frequency at a new pole position.

The circuit for operating the relay contacts to establish synchronism includes transistors 96 and 97 connected as AND gates. The 40 c.p.s. rate sequencing pulses 26 derived by the photocell 25 and appearing on line 27 are applied at the input line 98 capacitively coupled to the base of transistor 96. The sync pulses which occur at a 120 c.p.s. rate are applied to the line 99 capacitively coupled to the base of transistor 97. When the 40 c.p.s. sequencing pulses and the 120 c.p.s. sync pulses are in phase, the gate passes pulses which are applied to a one-shot multivibrator consisting of the transistors 101 and 102 and the associated circuitry. The multivibrator turns on for a period which is controlled by capacitor 105 and resistor 103 to form output pulses having a corresponding duration. The period is adjusted so that the pulse duration is less than 1/40th of a second whereby one pulse will terminate prior to the beginning of the next. The output pulses 104 are applied to an RC network consisting of the resistor 105 and capacitor 106. The pulses serve to charge the capacitor to a voltage corresponding to the peak voltage of the pulses. The RC network has a time constant such that as long as pulses 104 are applied, the capacitor maintains its charge and the DC voltage level. The voltage is applied to the base of transistor 107 which is maintained fully conducting.

The pulses 104 continue to occur unless and until the color wheel falls out of phase as indicated by the loss of synchronism between the vertical sync pulses and the sequencing pulses. When synchronism is lost, the gates will not pass pulses and the capacitor will begin to discharge thereby cutting off transistor 104, at which time no current passes through the relay coil 108 and the contacts 93, 94 and 109, 110 open. The resistor 92 is connected in the motor circuit and the motor slips. At the same time, the capacitor 111 permits current to flow from the coil to ground. The contactors will move to closed positions and the cycle repeated as long as the transistor 107 is cut off. The stepping continues until the 40 c.p.s. and 120 c.p.s. pulses are again in synchronism.

TARGET OUTPUT CIRCUITS AND PREAMPLIFIER

Figure 4:
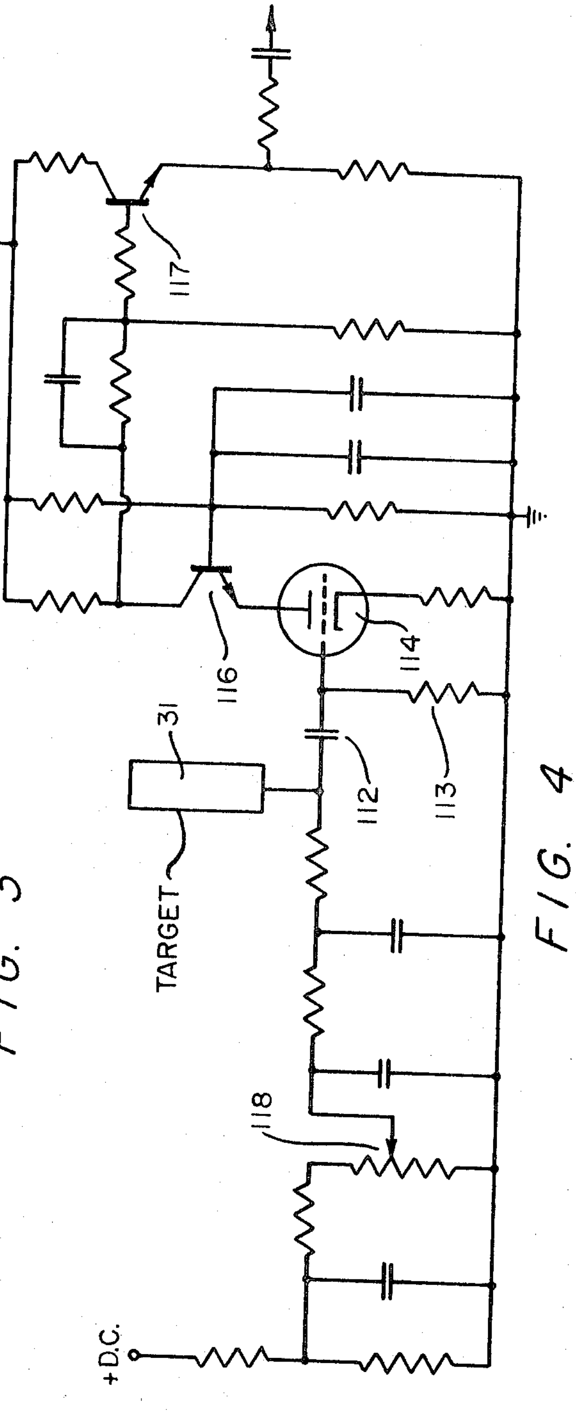
FIG. 4 is a schematic circuit diagram of a suitable target voltage supply and output pre-amplifier used in the system.

In addition to post-acceleration, lag in the camera tube is reduced by providing a low impedance output load for the target 34. Referring to FIG. 4, the output from the target is applied to a circuit including capacitor 112 and resistor 113. In one example, the components had values of 0.1 microfarad and 39 k ohm. The load is selected to provide a lower than normal output voltage which is then applied to the grid of vacuum tube 114 connected in circuit with a transistor 116. The resistor 113 is carefully chosen since a value which is too high will provide a smearing of the picture because of increased lag, while a value which is too low provides an output voltage which is small and noisy. The combination of the tube 114 and transistor 116 provides a low noise preamplifier circuit. The output of the transistor 116 is applied to a transistor 117 connected in an emitter-follower circuit. The low impedance output signal from the emitter-follower transistor 117 is then applied to next video amplifier 38.

The circuit including the +DC supply and associated resistors and capacitor provides the target voltage which can be adjusted by adjustment of the potentiometer 118.

SEQUENCE PULSE GENERATOR

Figures 5, 6:
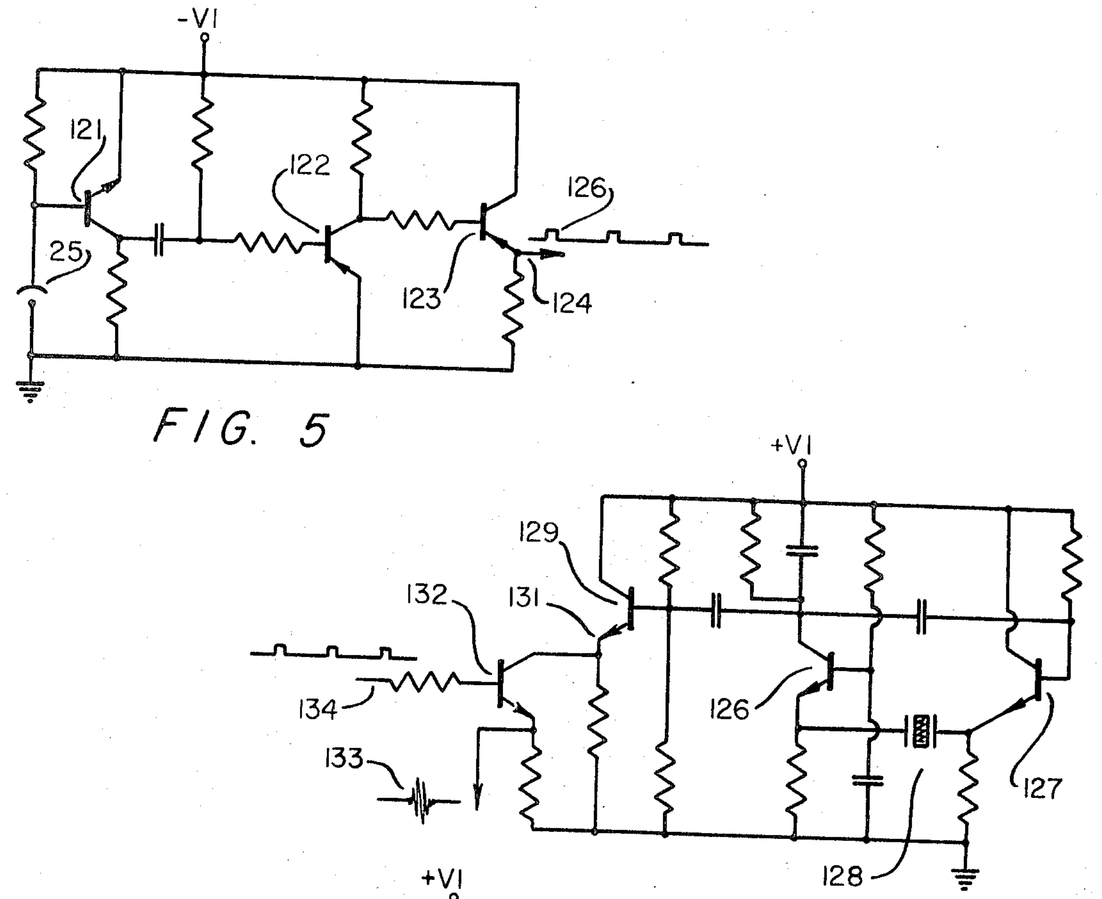
FIG. 5 is a circuit diagram of the sequence pulse generator suitable for use in the system.
FIG. 6 is a circuit diagram of the burst generator suitable for use in the system.

FIG. 5 shows a suitable sequence pulse generator. The circuit includes the photoelectric transducer 25 connected to drive the base of a transistor 121 connected in an amplifier circuit. The amplified output is applied to a second amplifier including transistor 122 and then to an emitter-follower circuit including transistor 123. The output sequencing pulses 126 appear on the line 124.

As previously described, the sequencing pulses are applied to the motor control circuit, to the color burst generator and to the sequence timer.

BURST GENERATOR

The 100 kc. red field burst generator 81 is shown in FIG. 6. The burst pulse generator comprises a free-running crystal-controlled oscillator including transistors 126, 127, crystal 128 and associated circuitry. The crystal and associated circuitry is selected whereby to oscillate at the 100 kc. rate. The output of the oscillator is applied to the base of a transistor 129 connected in an emitter-follower circuit. The output at the emitter 131 is gated by a gating transistor 132 so that an output burst 133 appears at the emitter of the transistor 132. The line 134 connected to drive the base of transistor 132 is connected to receive the sequencing pulses 26.

VERTICAL OSCILLATOR CIRCUIT

Figure 7:
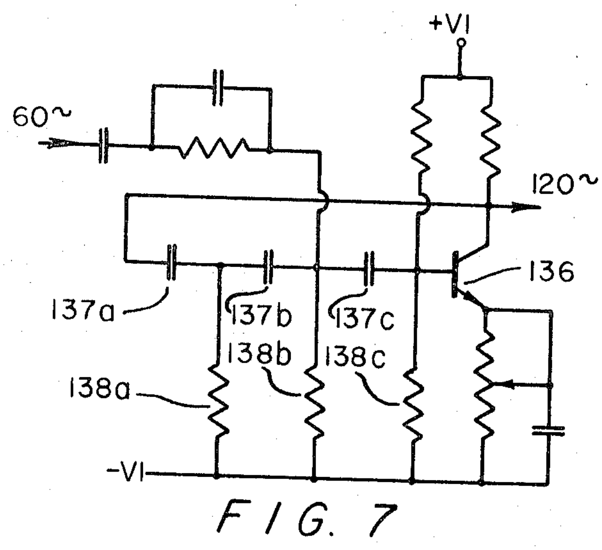
FIG. 7 is a circuit diagram of a vertical oscillator suitable for use in the system.

The vertical oscillator 66 can be a conventional oscillator including a frequency doubler circuit. A phase shift oscillator is shown in FIG. 7. The oscillator comprises a transistor 136 connected in an oscillator circuit with three capacitors **137*a*, 137*b* and 137*c* and three resistors 138*a*, 138*b* and 138*c* forming 120° phase shift sections in the feedback circuit to give the desired phase shift between the collector and base of the transistor 136. The oscillator may be locked to operate at line frequency by applying the 60 c.p.s. line voltage to the junction between the capacitors 137*b* and 137*c***, the 240° phase shift point. The injected 60 c.p.s. signal locks the oscillator which operates at twice the line frequency.

SEQUENCE TIMER

Figure 8:
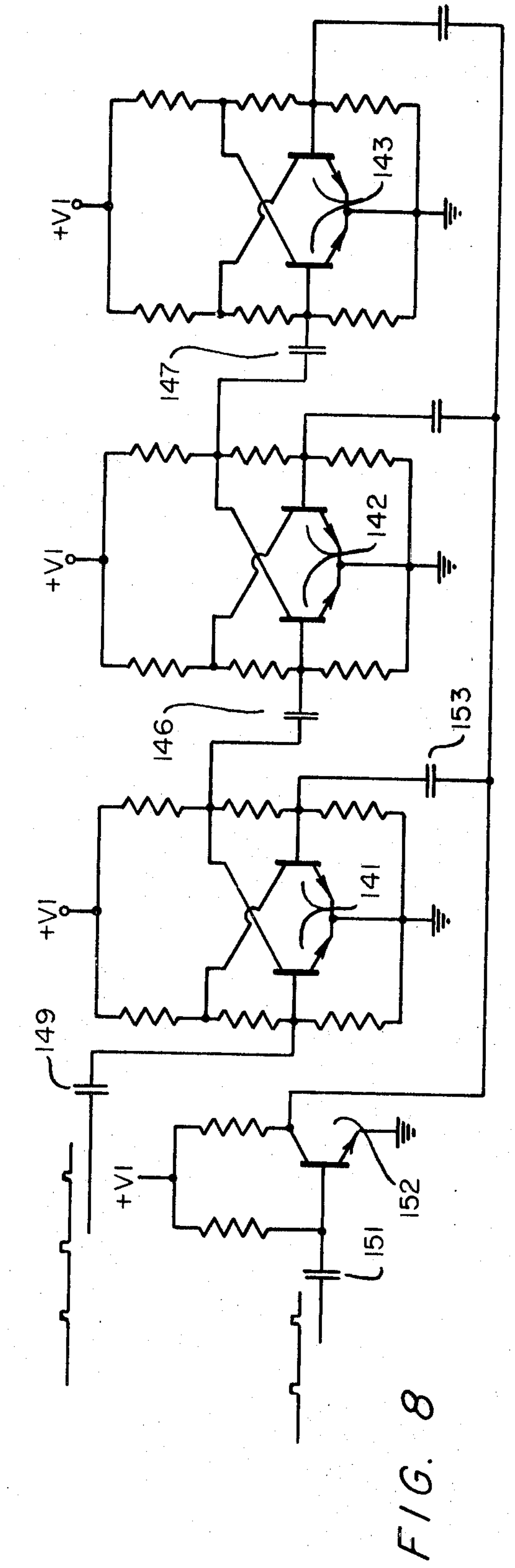
FIG. 8 is a circuit diagram of the sequence timer suitable for use in the system.

The sequence timer 61 may be of the type shown in FIG. 8. The sequence timer illustrated comprises three pairs of transistors connected in flip-flop circuits 141, 142 and 143. The output of the first flip-flop is capacitively coupled by capacitor 146 to the second; the output of the second flip-flop is coupled by the capacitor 147 to the third. The sequencing pulses are applied through capacitor 149 to the base of one of the transistors in flip-flop circuit 141. The flip-flop is triggered on and remains on until a 120 c.p.s. turn-off pulse is applied. The turn-off pulses are derived from the vertical sync pulses applied through capacitor 151 to the base of transistor 152 which acts as an amplifier. The turn-off pulse for flip-flop 141 is through the capacitor 153 to the base of the other transistor which turns off the flip-flop. A signal is then applied through the capacitor 146 to trigger on the next flip-flop 142 which stays on until the next 120 c.p.s. turn-off pulse occurs. The next flip-flop 143 is turned on by applying a signal through the capacitor 147 and turned off by the next occurring 120 c.p.s. turn-off pulse. The sequencer phase is maintained by the sequencing pulses.

Another way of accomplishing substantially this same switching effect would be to have three one-shot multivibrators arranged so that the first is triggered by the color burst and its operation triggers the next two in sequence with the time constant of the multivibrators set at 1/40th of a second. A disadvantage with this system is that the second two multivibrators might lose a little timing because of drift or the like.

DISPLAY TUBE CONTROL

As previously described, the composite field sequential color signal appearing at the output of the video amplifier 63 includes color field signals, vertical and horizontal sync pulses and 100 kc. burst signals identifying the beginning of each red field. These signals are employed to drive a display tube connected in a conventional receiver circuit.

Figure 9:
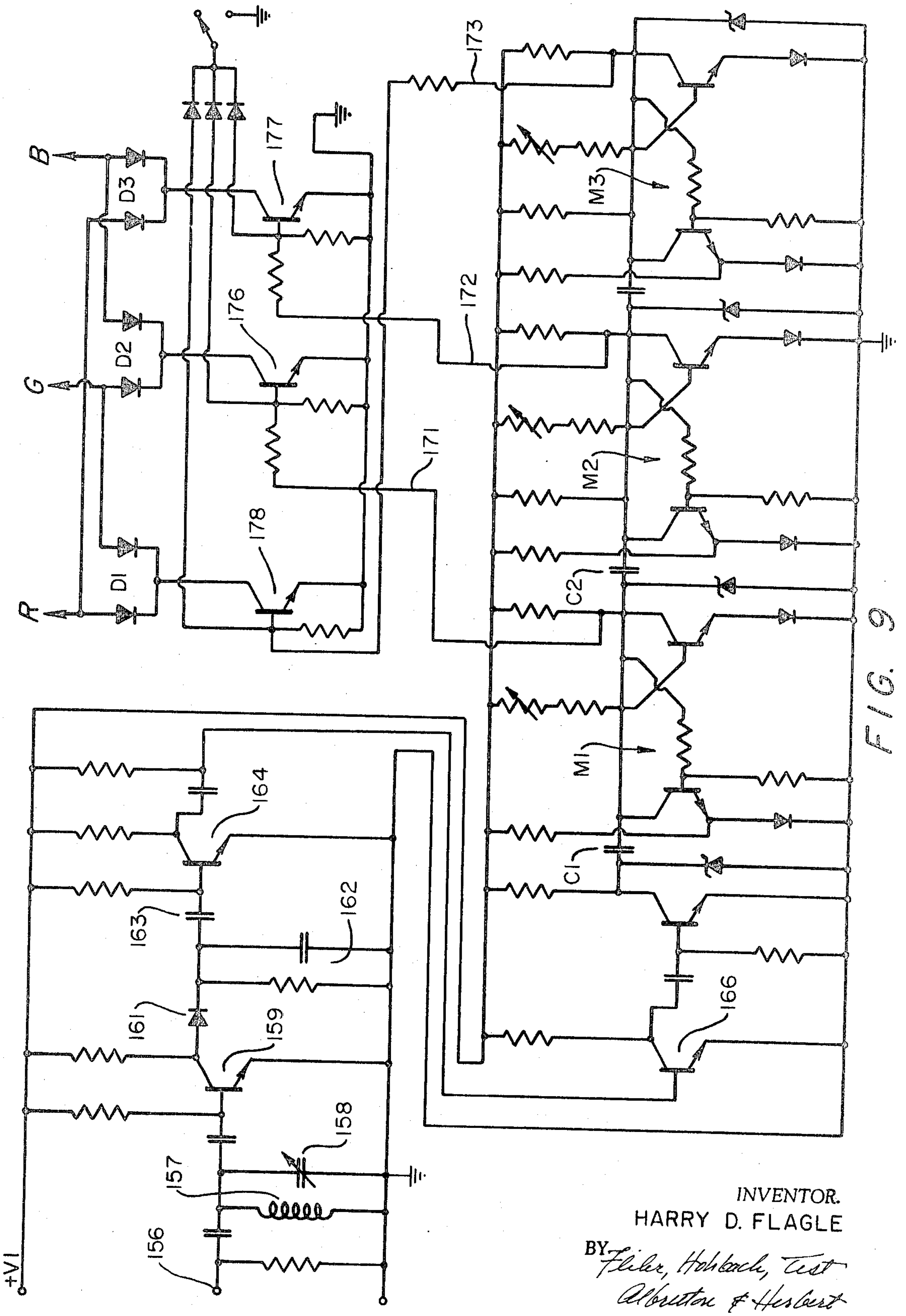
FIG. 9 is a circuit diagram of the circuit for receiving the signal to be displayed and processing the same to control operation of the receiver to display the color information.

The field sequential color signal is applied to the receiver where the vertical and horizontal sync pulses are separated and employed to control the deflection circuits and to a circuit which serves to separate out the 100 kc. bursts. Referring to FIG. 9, the composite pulses are applied to the terminal 156 and to a tuned circuit including inductor 157 and capacitor 158 which are tuned to 100 kc. and serve to apply the burst signal to the base of the transistor 159. The signal is amplified by the transistor 159 and applied, through a diode 161 which rectifies the 100 kc. signal to provide a DC pulse, to the filter network 162. These filtered pulses are applied to transistor 164 through capacitor 163. The transistor amplifies the pulses to provide sequencing pulses at a 40 c.p.s. rate coincident with the red field. The sequence timer circuit includes three multivibrators M1, M2 and M3, each including a pair of transistors and associated circuitry. The output signal from the amplifier including transistor 164 is amplified by an amplifier circuit including the transistor 166 to the first multivibrator which has a period of 1/120th of a second and which, on turning off, forms a pulse which appears at the capacitor C1 which is applied to control the next multivibrator M2 which, in turn, generates a pulse which is coupled by the capacitor C2 through an amplifier to the next multivibrator M3. After this sequence has been completed, the next burst serves to trigger the first multivibrator and the sequence repeats. Thus, the three multivibrators generate pulses at 120 cycle rate. These pulses are available at the collector of the second tube of each multivibrator pair with the pulse on the line 171 being in phase with the red color field; the pulse on the line 172 being in phase with the blue color field; and the pulse on the line 173 being in phase with the green color field. The pulses on the lines 171, 172 and 173 are applied to the base of transistors 176, 177 and 178, respectively, which control the diode gating circuit including three diode pairs D1, D2 and D3. The pairs of diodes are sequentially connected to ground through the conducting transistors 176, 177 and 178 to provide control signals R, G and B. For example, when a red pulse is generated on the line 171, transistor 176 conducts grounding the B and G lines. Thus, under that circumstance, the red pin of the associated color tube will be allowed to energize thereby energizing the red gun to provide a red field, etc.

Figure 10:
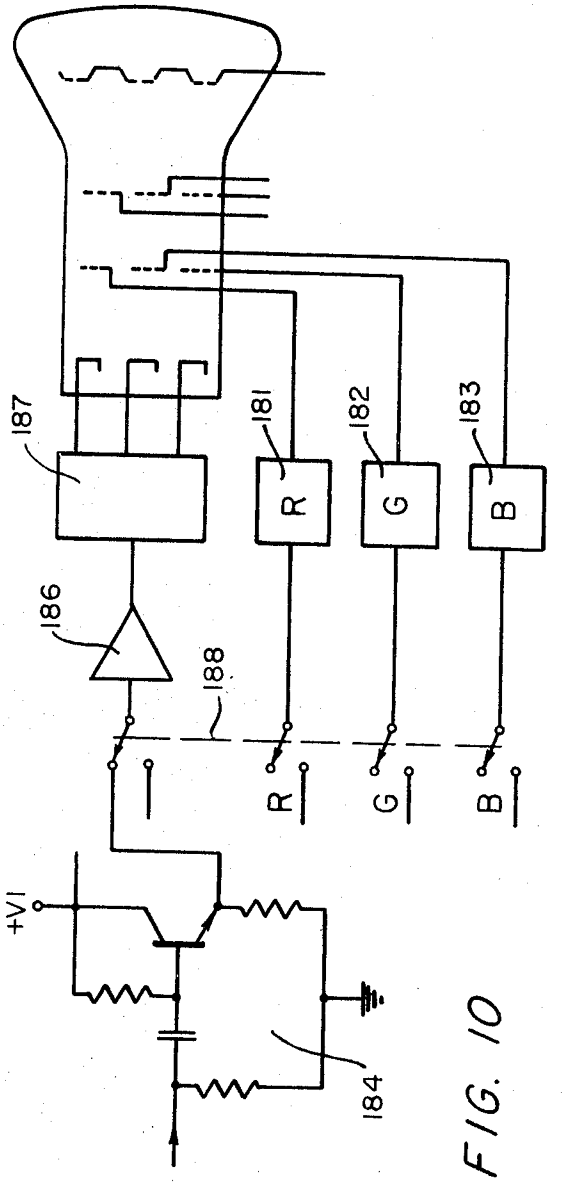
FIG. 10 is a schematic diagram showing the input to the display tube circuits for a typical receiver.

Referring now to FIG. 10, the signals appearing on the lines R, G and B are connected to the corresponding electrode control amplifiers 181, 182 and 183, respectively, to thereby energize the appropriate electron gun. The video signal is applied to the video circuits through an emitter-follower amplifier 184. The signal is then amplified by video amplifier 186 and applied to the drive control circuits 187 of the display tube. The switch 188 is shown in the position for receiving field sequential signals. When the switch is connected to its other position, it serves to connect the video amplifier 186 and drive controls to the conventional receiver circuits whereby the receiver functions to receive and display NTSC signals.

RECORDER-REPRODUCER

Figure 13A:
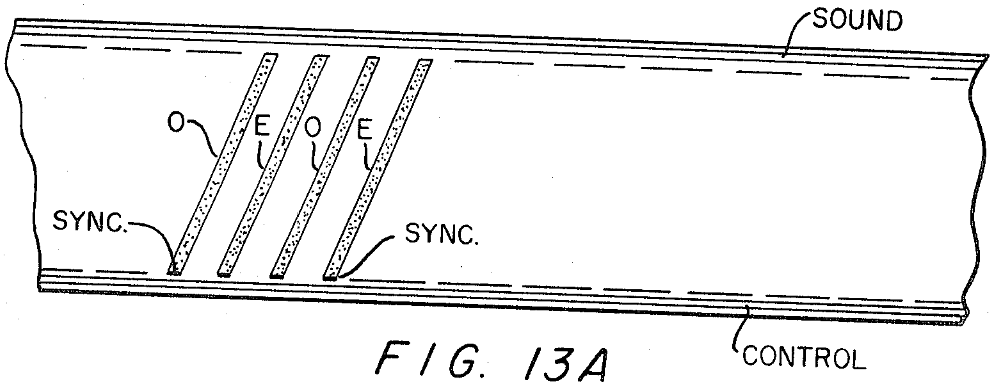
FIG. 13A shows a section of magnetic tape from a black and white television signal magnetic tape recorder showing a black and white television signal recorded thereon.
Figure 13B:
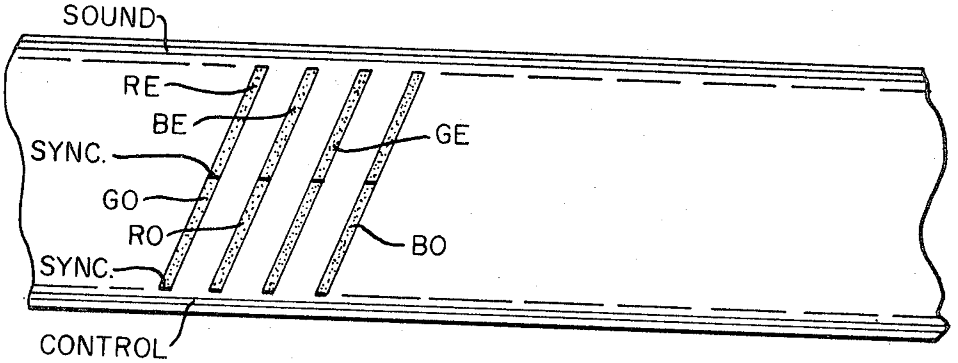
FIG. 13B shows a section of magnetic tape from a block and with television signal magnetic tape recorder showing the color signals in accordance with the present invention recorded thereon.

Since the field sequential signals of the present invention are substantially identical to black and white signals, they can be recorded on a conventional black and white recorder. This is in contrast with recorders used in connection with the frequency interlace signals of comparable color television where recorders having good time stability are required. In conventional black and white recording on a helical scan recorder, each scan includes one field and its vertical sync signals as shown in FIG. 13A where each dotted band represents a field and the dark lines a vertical sync pulse. The upper and lower longitudinal tracks are for control and sound signals. In the present system, the sequential fields are at a 120 c.p.s. rate and two fields with their vertical sync signals appear on each scan as shown in FIG. 13B.

For a complete picture having even and odd fields of each color, a total of six fields on three scans is required, whereas for the even and odd signals in black and white, two scans are required. The timing, however, is the same and the recorder operates in synchronism with the applied sequential fields.

I claim:

1. In a color television system for generating television signals comprising means for generating horizontal and vertical sync signals, a camera tube including a beam adapted to be deflected responsive to said horizontal and vertical sync signals to scan an image impinging upon the tube and means providing output sequential field signals representative of said image at the vertical sync rate, a rotating member disposed to filter light impinging on said camera tube to cause red, green and blue images of the subject being viewed to impinge upon the camera tube, a synchronous motor for rotating said rotating member at a speed which provides images in synchronism with the vertical sync signals, said motor including a phasing resistor adapted to be selectively connected in the motor circuit, means for generating sequencing pulses each time the beginning of one color of said field or image occurs, and means for receiving said vertical sync pulses and said sequencing pulses and serving to selectively connect the resistor in the motor circuit to control the phase of the motor to maintain said sequence pulses and vertical sync pulses in phase.

2. In a color television system for generating television signals comprising means for generating horizontal and vertical sync signals, a camera tube including a beam adapted to be deflected responsive to said horizontal and vertical sync signals to scan an image impinging upon the tube and means providing output sequential field signals representative of said image at the vertical sync rate, a rotating member disposed to filter light impinging on said camera tube to cause sequentially only red, green and blue images of the subject being viewed to impinge upon the camera tube, amplifying means for receiving the output sequential field signals from said camera tube, red, green and blue gain control means for receiving said amplified signals and for adjusting the amplitude of each of said amplified signals, a video amplifier, and red, green and blue gating means connected between said video amplifier and said red, green and blue gain control means respectively to sequentially gate individual field signals corresponding to said three colors from the red, green and blue gain control means in synchronism with said vertical synchronizing signals.

3. A color television system as in claim 2 together with means for generating a sequencing pulse at the beginning of one color field, sequencing means connected to receive the vertical sync pulses and the sequencing pulses and control said gating means whereby said individual field signals are gated in synchronism with said color wheel.

4. A color television system as in claim 2 including means for controlling the amplitude of said sequential field signals at said amplifying means.

5. In a color television system for generating television signals comprising means for generating horizontal and vertical sync signals, a camera tube including a beam adapted to be deflected responsive to said horizontal and vertical sync signals to scan an image impinging upon the tube and means providing output sequential field signals representative of said image at the vertical sync rate, a rotating member disposed to filter light impinging on said camera tube to cause red, green and blue images of the subject being viewed to impinge upon the camera tube, a synchronous motor for rotating said rotating member at a speed which provides images in synchronism with the vertical sync signals, means for generating sequencing pulses each time the beginning of one color of said field or image occurs, means for receiving said vertical sync pulses and said sequencing pulses and serving to control the phase of the motor to maintain said sequence pulses and vertical sync pulses in phase, amplifying means for receiving the output sequential field signals from said camera tube and applying same to gain control means for adjusting the gain for each color, clamping means connected to receive the output of said gain control means to maintain the reference level for each color signal, means responsive to said sequencing pulses and said vertical and horizontal synchronizing signals for generating synchronizing signals having horizontal and vertical sync pulses and a high frequency burst identifying the beginning of the field corresponding to said one color to synchronize a receiver, a video amplifier connected to receive said synchronizing signals, and gating means connected between said video amplifier and said clamping means to sequentially gate individual field signals corresponding to said three colors from the clamping means in synchronism with said synchronizing signals whereby the combined output signal of the video amplifier contains a signal having sequential fields with vertical and horizontal synchronizing pulses and a burst signal identifying the beginning of said one field to synchronize the receiver.

6. In a color television system for forming a color television picture of a subject comprising means for generating horizontal and vertical sync signals, a camera tube including a beam adapted to be deflected responsive to said horizontal and vertical sync signals to scan an image of said subject impinging upon the tube and means providing output sequential field signals representative of said image at the vertical sync rate, a rotating member disposed to filter light impinging on said camera tube to cause red, green and blue images of the subject being viewed to impinge upon the camera tube, a synchronous motor for rotating said rotating member at a speed which provides images in synchronism with the vertical sync signals, means for generating sequencing pulses each time the beginning of one color of said field or image occurs, means for receiving said vertical sync pulses and said sequencing pulses and serving to control the phase of the motor to maintain said sequence pulses and vertical sync pulses in phase, amplifying means for receiving the output sequential field signals from said camera tube and applying same to gain control means for adjusting the gain for each color, clamping means connected to receive the output of said gain control means to maintain the reference level for each color signal, means responsive to said sequencing pulses and said vertical and horizontal synchronizing signals for generating synchronizing signals having horizontal and vertical sync pulses and a high frequency burst identifying the beginning of the field corresponding to said one color to synchronize a receiver, a video amplifier connected to receive said synchronizing signals, gating means connected between said video amplifier and said clamping means to sequentially gate individual field signals corresponding to said three colors from the clamping means in synchronism with said synchronizing signals whereby the combined output signal of the video amplifier contains a signal having sequential fields with vertical and horizontal synchronizing pulses and a burst signal identifying the beginning of said one field, a color receiver having red, green and blue circuits connected to receive said output signal, means for receiving said output signal and separating out said burst signal, means responsive to said burst signal serving to control said receiver to thereby selectively display said sequential field signals to produce a color picture of the subject.

7. A color television system as in claim 6 wherein said last named means comprises sequence means for generating signals for controlling said receiver.

* * * * *